Figure 1:
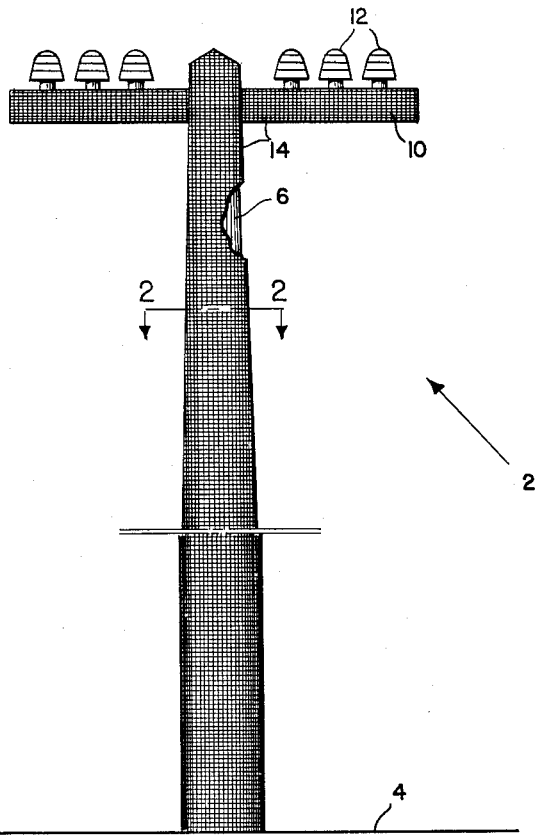

June 27, 1961  C. C. COHN  2,989,789
SMALL ANIMAL REPELLING STRUCTURES
Filed Jan. 25, 1957

INVENTOR.
CHARLES C. COHN
BY
ATTORNEYS

United States Patent Office 2,989,789
Patented June 27, 1961

2,989,789
SMALL ANIMAL REPELLING STRUCTURES
Charles C. Cohn, Atlantic City, N.J., assignor to Samuel L. Cohn and Charles C. Cohn, doing business as Colonial Alloys Company, Philadelphia, Pa., copartners
Filed Jan. 25, 1957, Ser. No. 636,286
3 Claims. (Cl. 20—100)

This invention relates to small animal repelling structures and more specifically to structures for preventing small animals expecially birds from walking or roosting on surfaces such as, for example, trees, public utility poles, building surfaces including roofs, cornices, storage bins and the like, and other surfaces similarly undesirably frequented by small animals.

A prime example of the undesirability of birds roosting and walking on surfaces is the annual damage estimated to be in the neighborhood of $12,000,000 caused by pileated woodpeckers damaging wooden utility poles. A further common example of undesirable roosting of birds can be found around many public buildings where starlings and pigeons roost in cornices, under eves and in other sheltered locations. Small animals such as mice and other rodents cause a substantial amount of damage to buildings and by their inroads into the contents of storage bins for grains and other similar materials attractive to these animals.

Many and varied expedients have been examined in an attempt to prevent small animals and especially birds from walking or roosting on surfaces. Various electrical devices have been employed, however, these devices are both expensive and are relatively unsafe. Various chemical means have been employed such as odor producing chemicals, itchants, irritants and poisons. These have all been considered unsatisfactory for the reason that the odor producing materials are objectionable to humans, the poisons are damaging to desirable game and wildlife, and the poisons, itchants and irritants are dangerous to humans, especially children. Furthermore, notwithstanding these objections the various foregoing chemical expedients have not been found to be effective for the purpose desired.

Mechanical devices have also been employed such as traps, noise making devices, fluttering streamers, enclosure screens, sharp objects such as nails, cut-sheet metal and the like. However, these various mechanical arrangements have not proved effective. The noise is objectionable to humans and the traps are ineffective because the animals must be released especially when the animals involved are birds. Fluttering streamers are relatively ineffective, screened enclosures become expensive and sharp objects such as nails and the like have been found to be totally ineffective.

I have found, after considerable study of the problem, that a resilient material which will give or yield under the foot of a bird or other animal so as to provide an insecure footing and particularly resilient materials which will give rise to an insecure yielding as well as either a slippery or an entangling footing provide a surface which is substantially 100% effective in keeping woodpeckers from obtaining a footing from which to do their pecking. The surface is also highly effective in merely keeping birds from roosting on the surface and is also effective in repelling other small animals.

The structures which I have found to be most effective are in the form of a yielding foraminous structure which, as previously noted, provides either an entangling and insecure footing which will yield under the weight of the animal, or a slippery structure or surface which cannot be gripped by a small animal.

Among those materials which I have found to be highly effective are the following: strands of material which are arranged either in random array such as, for example, steel wool or small coils of a resilient material, or are in the form of long strands in an upstanding orderly array such as a pile, a heavy nap or a dense fur. I have found sponge materials to be effective. Mesh materials such as woven or knitted fabrics providing yielding strands between the knitted loops or the thread crossings and mesh materials such as loose net materials positioned in spaced relation from the surface to be protected so that the entire net sheet yields or moves under the animal's foot.

The foregoing structures may be formed of metals such as strands or filaments of aluminum or other suitable corrosion resistant metals, rubber or plastic sponges of fibers as well as glass fibers and animal hair or wool fibers. Vegetable fibers may also be employed particularly when the vegetable fiber presents a fuzzy or furry exterior surface.

Sheets of mesh materials such as woven or knitted fabrics or nets, and panels of strands of material arranged in random array such as sponges and steel wool may be positioned in spaced relation with the surface from which it is desired to repel animals. Any conventional positioning or attaching means may be employed such as, for example, nails or cleats which will support the material in spaced relation with the surface. Panels of orderly arrays of strands such as fur may be fastened directly against the surface to be protected with the strands extending outwardly therefrom. Conventional attaching means such as nailing, stapling wrapping or cementing may obviously be employed for attaching these materials.

From the foregoing it will be evident that numerous structures may be employed in order to provide a small animal repellent covering providing a resiliently yielding foraminous surface affording a yielding insecure and preferably entangling or slippery footing for small animals. While it may be possible for the animals to cling to such a surface, the nature of the surface appears to afford a disquieting and unsatisfactory footing for the animal and, particularly when the surface is an entangling surface, the experience to the animal is a distressing one which the animal involuntarily seeks to avoid thereafter.

Figure 2:
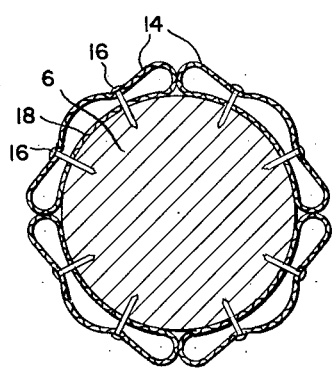

While the foregoing description has set forth my invention broadly as applied to numerous types of building or similar structures, it is noted that may invention is essentially involved in the construction of an outdoor utility pole which is resistant to the attacks of woodpeckers. An outdoor utility pole made of wood and covered with a structure providing a resiliently yielding loosely foraminous surface presenting a yielding and insecure footing for small animals will substantially eliminate the presently experienced high loss suffered by the utility companies as a result of the activities of woodpeckers. Such a pole is set forth in the following description in conjunction with the accompanying drawing in which:

FIGURE 1 is a showing of an erected pole;
FIGURE 2 is a transverse section through the pole taken on the trace 2—2 shown in FIGURE 1; and
FIGURE 3 is a transverse section through a pole showing another form of the invention shown in FIGURE 2.

In FIGURE 1 there is shown generally at 2 an erected utility pole 6 positioned in the earth 4 and attached to the upper end of the pole 6 is a conventional cross-arm 10 provided with studs mounting wire carrying insulators 12. The body and the cross-arm of the pole are sheathed in a suitable material 14 serving to prevent birds or other small animals from securing a foothold on the pole.

FIGURE 2 is a section taken through the pole shown in FIGURE 1 and shows the pole 6 having attached thereto sleeves of material such as, for example, a knitted fabric of aluminum ribbon. Nails 16 driven through the sleeve of material into the pole serve to position the material with the outer layer 14 of the material spaced from the inner layer 18 of the material. The material may be, for example, knitted from an aluminum ribbon approximately 1/32" wide and 0.005" thick with spacings between adjacent walls of approximately 3/16". It will be evident from the foregoing that woven fabrics and net materials may also be employed provided that they are mounted to provide an outer layer or sheet of material such as the layer 14 shown in FIGURE 2 which is spaced from the pole 6 in order to provide a yielding insecure footing which is preferably an entangling footing. The spacing between the layers 14 and 18 may be, for example, of the order of 1/4" to 3/4".

Figure 3:
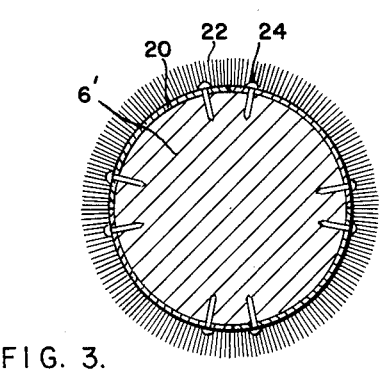

The arrangement shown in FIGURE 3 involves a pole 6' to which is attached a material 20 supporting substantially perpendicularly or radially extending fibers or hair 22. The material is attached by means of nails 24 driven into the pole and provides, by virtue of the upstanding orderly array of strands or hair 22, an insecure and slippery footing. The length of the strands or hair may be, for example, between approximately 1/4" to 3/4".

The cost of poles constructed in accordance with my invention will obviously be somewhat greater than the cost of conventional poles. However, when the great loss experienced in conventional poles from the activities of the woodpeckers is considered it will become evident that the additional initial cost is warranted in order to avoid the cost of replacement of the damaged poles. The structures described above and shown in FIGURES 2 and 3 will make it substantially impossible for a woodpecker to secure a suitable footing from which to accomplish his pecking.

It will be evident that any of the various structures disclosed therein may be employed in the manner shown in the figures and that details of these structures and their attaching means may be varied without departing from the invention as set forth in the following claims.

What is claimed is:

1. The combination comprising a structure having an exposed outer surface, a protective covering of foraminous material over said surface, and spaced means securing said covering to said surface with the portions of said covering between spaced securing means bulging outwardly from said surface, said bulging portions of the covering being yieldable under the weight of any small animal or bird whereby to present an insecure footing to such an animal or bird attempting to alight thereon.

2. The combination comprising a structure having an exposed outer surface, and a protective covering over said surface including a plurality of foraminous elements on said surface, and spaced means securing said elements to said surface with the portions of said elements between spaced securing means bulging outwardly from said surface, said bulging portions of the elements being yieldable under the weight of any small animal or bird whereby to present an insecure footing to such an animal or bird attempting to alight thereon.

3. The combination comprising a structure having an exposed outer surface, and a protective covering over said surface including a plurality of sleeves of resilient foraminous material on said surface, and spaced means securing said sleeves to said surface with the portions of said sleeves between spaced securing means bulging outwardly from said surface, said bulging portions of the sleeves being yieldable under the weight of any small animal or bird whereby to present an insecure footing to such an animal or bird attempting to alight thereon.

References Cited in the file of this patent

UNITED STATES PATENTS

| | | |
|---|---|---|
| 389,047 | Birth | Sept. 4, 1888 |
| 503,948 | Crews | Aug. 29, 1893 |
| 514,306 | Clines | Feb. 6, 1894 |
| 550,282 | Martin | Nov. 26, 1895 |
| 581,502 | Atkin | Apr. 27, 1897 |
| 600,645 | Jessup | Mar. 15, 1898 |
| 2,148,334 | Worthmann | Feb. 21, 1939 |
| 2,777,171 | Burnside et al. | Jan. 15, 1957 |

OTHER REFERENCES

"Nixolite-Bird and Climbing Animal Barrier and Repellent." Sweet's Catalog Service Architectural File, 1955, 5i/Ni.